E. Ogden.
Harvester-Rake.
No. 75570. Fig. 1. Patented Mar. 17, 1868.
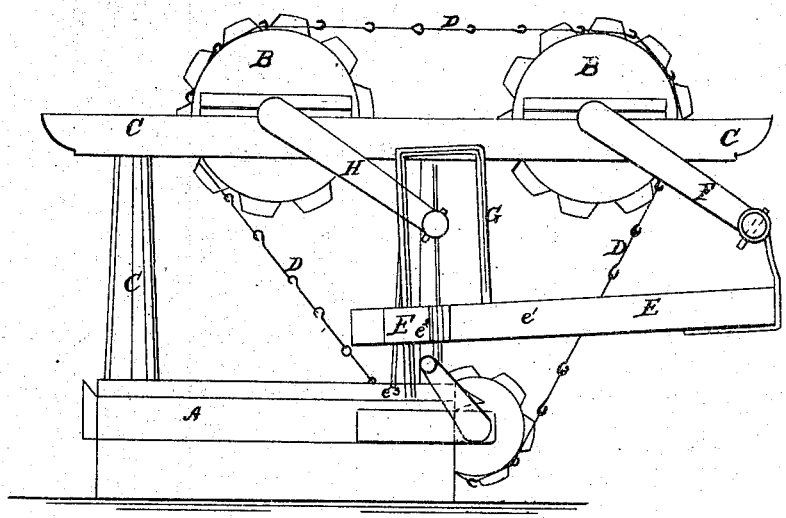
Fig. 2.
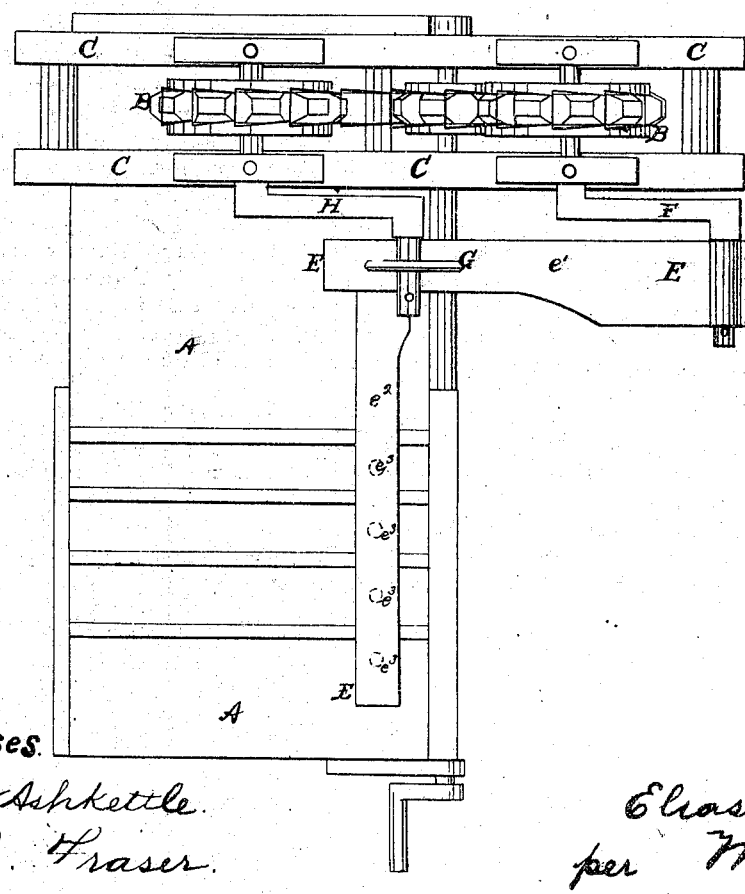
Witnesses.
H. C. Ashkettle.
J. A. Fraser.
Inventor.
Elias Ogden
per Munn & Co
attorneys

United States Patent Office.

ELIAS OGDEN, OF LYNCHBURG, VIRGINIA.

Letters Patent No. 75,570, dated March 17, 1868.

IMPROVEMENT IN HARVESTER-RAKES.

The Schedule referred to in these Letters Patent and making part of the same.

TO ALL WHOM IT MAY CONCERN:

Be it known that I, ELIAS OGDEN, of Lynchburg, in the county of Campbell, and State of Virginia, have invented a new and useful Improvement in Platform-Rakes; and I do hereby declare that the following is a full, clear, and exact description thereof, which will enable others skilled in the art to make and use the same, reference being had to the accompanying drawings forming part of this specification.

Figure 1 is a front view of my improved platform-rake.

Figure 2 is a top or plan view of the same.

Similar letters of reference indicate corresponding parts.

My invention has for its object to improve the construction of platform-rakes for reapers, so as to make them more convenient and effective in operation; and it consists in the construction of the rake, and in the combination of the parts by which the rake is operated, the whole being constructed and arranged as hereinafter more fully described.

A represents the rear part of the platform of a reaper, upon which the grain falls from the cutters. B are two crank-wheels, which revolve in bearings in the framework C, attached to the platform A, or to the frame of the reaper. Motion is communicated to the wheels B, from the drive-wheel or drive-shaft of the reaper, by means of an endless chain, D, a belt, gear-wheels, or by any other of the well-known means for such purposes. E is the rake, which is made in L-form, or is formed by two bars $e^1$ and $e^2$, which meet, and are secured to each other at right angles, as shown in fig. 2. To the forward arm $e^2$ of the rake E which sweeps over the platform A, are attached the rake-teeth $e^3$, which pass along grooves in the said platform, said grooves being formed in the platform itself, or by attaching ribs to it, as may be desired or convenient. The inner or free end of the arm or bar $e^1$ is pivoted to the inner crank F of the inner crank-wheel B, so that the rake may be moved back and forth by the revolution of the said crank F. G is a long staple, or an arm, having a wide slot formed in it, as shown in fig. 1, in which staple or slotted arm the crank-pin of the outer crank H works, said staple or slot being of such a width that the said crank-pin need not touch its sides, the only object of said crank H being to raise the rake E from the platform A, and hold it suspended while passing back to sweep another bundle or sheaf from the platform.

By this construction and arrangement, the rake passes down at one side of the platform, moves across it, sweeping the bundle or sheaf off at the other side. The rake is then raised by the action of the outer crank H, and, while raised, is carried back to the other side of the platform by the action of the inner crank F, ready to sweep another bundle from said platform.

I claim as new, and desire to secure by Letters Patent—

The combination of the two crank-wheels B, two cranks F H, staple or slotted arm G, and Lh-saped rake E with each other, substantially as herein shown and described, and for the purpose set forth.

ELIAS OGDEN.

Witnesses:
GEO. M. RUCKER,
R. F. HENING.